United States Patent [19]

Thompson et al.

[11] Patent Number: 4,704,171

[45] Date of Patent: Nov. 3, 1987

[54] LAMINATING DEVICE WITH PAPER TENSION CONTROL

[75] Inventors: Roger A. Thompson, Littleton; James W. Jensen, Boulder, both of Colo.; Darrell L. Templeton, Lawrenceberg, Tenn.

[73] Assignee: Adolph Coors Company, Golden, Colo.

[21] Appl. No.: 835,234

[22] Filed: Mar. 3, 1986

[51] Int. Cl.[4] .............................................. B65B 41/18
[52] U.S. Cl. .......................................... 156/64; 53/51; 156/164; 156/361; 156/495; 226/29
[58] Field of Search ...................... 53/51; 156/64, 164, 156/361, 495; 226/27, 28, 29

[56] References Cited

U.S. PATENT DOCUMENTS

| | | | |
|---|---|---|---|
| 3,762,125 | 10/1973 | Prena | 226/27 X |
| 3,908,331 | 9/1975 | Donnet | 53/51 X |
| 4,129,238 | 12/1978 | Herd | 226/29 |
| 4,254,173 | 3/1981 | Peer | 428/215 X |
| 4,403,718 | 9/1983 | Nagano | 226/27 |
| 4,411,393 | 10/1983 | Jodrey et al. | 226/29 X |
| 4,496,417 | 1/1985 | Haake et al. | 156/495 X |
| 4,572,752 | 2/1986 | Jensen et al. | 156/64 |
| 4,610,739 | 9/1986 | Jensen | 156/64 |

Primary Examiner—Robert A. Dawson
Attorney, Agent, or Firm—Klaas & Law

[57] ABSTRACT

A laminating device for laminating a continuous web of paper material to a continuous web of film material for forming a continuous web of laminated composite material at a laminating nip. Apparatus for dividing the paper web into at least two segregated tension zones upstream of the laminating nip and for dividing the composite web into at least two segregated tension zones downstream of the laminating nip are described. Control systems for monitoring and maintaining the tension in each tension zone at different, preset values, are also described.

19 Claims, 5 Drawing Figures

LAMINATING DEVICE WITH PAPER TENSION CONTROL

BACKGROUND OF THE INVENTION

The present invention relates generally to the production of laminated paper products and more particularly to a method of lamination and a device for laminating a continuous roll of plastic film material to a continuous roll of paper backing material wherein the device has a system for controlling the tension in the paper material to ensure proper lamination of the paper material with the film material.

Lamination of a plastic film material to a paper material has been found to be particularly advantageous where paper products having high strength and abrasion resistant qualities are required. Such laminated composites are particularly desirable in the packaging industry, where artwork may be printed on the interior side of the plastic film to produce a high quality display package. The construction and use of such laminated composites are described in Peer, U.S. Pat. No. 4,254,173 and in Haake et al., U.S. Pat. No. 4,496,417 and U.S. patent application Ser. No. 624,480, filed June 22, 1984 by James Wendell Jensen, et al. (now U.S. Pat. No. 4,572,752) which are hereby incorporated by reference for all that is disclosed therein.

In producing a laminated composite of the type described in Peer, both the plastic film material and the paper material may be provided in continuous sheets from spools. The paper and the plastic film generally pass over a number of roller type devices where each of the materials are independently stretched out under tension and treated as necessary depending upon the particular end use for the laminated composite. For example, the plastic material may be irradiated in conventional processes to increase its strength or improve its printability. In preferred embodiments, the plastic is printed with various graphics and provided with a metalized background over the graphics to enhance the package appearance. The paper may undergo treatment as well such as being electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth flat composite. Various heating or cooling processes may also be required to ensure proper adhesion of the surfaces, depending on the type of the film, paper and adhesive agent which are being used in the process. The end product of the process is a laminated composite which may be fed directly to cutting dies or other machines for further processing. The composite may also be taken up directly on a separate spool for storage and later processing.

Use of the film/paper composite provides many advantages over conventional packaging material but also creates some unique problems. In order to be cost effective, the plastic material used is generally quite thin; on the order of 0.25–2.0 mils. Plastic films of such thicknesses tend to stretch or shrink during the lamination process as a result of variations in temperature and the different inertial forces exerted on the film as it is unrolled and processed prior to bonding with the paper. Such stretching and shrinking may cause warping or buckling in the laminated composite as the film returns to a steady state condition. Similarly, a printed image may be repeated on the film for later lamination, in registry with predetermined lengths of paper material. In such cases, the printed image length must be held within close tolerances in order to permit proper registry with other processing activities such as automated cutting in a later process step.

Apparatus for controlling the distortion of an extensible plastic film web used in a film/paper laminate are disclosed in the above referenced patent of Haake et al. and patent application of Jensen et al. It has been discovered by applicants that even minor tension variations in the paper web or the composite in such laminating apparatus may influence the quality of laminate that is produced. Such paper web and composite web tension variations may be due to a number of variables such as speed variations in the paper unwind spool or composite takeup spool due to changing spool size and/or spool eccentricity; variations in the speed of the laminating rolls due to tension changes in the film web associated with film web stretch control; variations in the speed of the laminating roll due to speed fluctuations in the paper unwind roller laminate takeup roll; variations in the speed of the laminating rolls due to drive motor voltage and current fluctuations or any combination of the above or other variables.

Applicants have discovered that by providing a plurality of isolated tension zones in the paper web and the composite web and by maintaining the tension in the different zones at relatively constant values through the use of electronic control systems, an improved quality laminate may be obtained. Applicants have further discovered that in a paper web having two such isolated tension zones upstream of the laminating nip that an improved laminate may be achieved by maintaining the tension in the relatively upstream zone above the tension in the relatively downstream zone.

SUMMARY OF THE INVENTION

The present invention comprises a method and apparatus for laminating a continuous web of paper material to a continuous web of plastic film material to form a continuous web of composite material. At a point on the paper web upstream of a laminating station where it is laminated to the film web, the paper web is divided into at least two different tension zones by a nip forming roller configuration which is preferably a so called "S-wrap" nip configuration. The tension in the portion of the paper web between the tension segregating rolls and the laminating station, is continuously monitored. A signal produced by the monitoring unit is used to control the speed of the tension segregating rolls relative the speed of paper takeup at the laminating station whereby the tension in the paper web positioned between the tension segregating rolls and the laminating station, is maintained at a relatively constant tension. The tension in the portion of the paper web upstream of the tension segregating rolls, is also maintained at a relatively constant value by use of another control system associated therewith. In the preferred embodiment, this control system includes a driven paper unwind spool having an adjustable speed control system and a deflectable dancer assembly or load cell based tension measuring system which generates a signal used to adjust the unwind spool speed. The tension in the portion of the paper web upstream of the tension segregating rolls is preferably maintained above the tension in the portion of the paper web positioned between the tension segregating rolls and the laminating station. A similar tension control system is employed for controlling tension in the composite web.

BRIEF DESCRIPTION OF THE DRAWINGS

FIG. 5 is a top view of a portion of a film web.

DETAILED DESCRIPTION OF THE INVENTION

In General

In general, the laminating device 10 comprises structure and controls for continuously laminating a continuous relatively extensible film web 12 to a continuous relatively non-extensible paper web 16 to form a continuous web of laminated composite 22.

Figure 1:
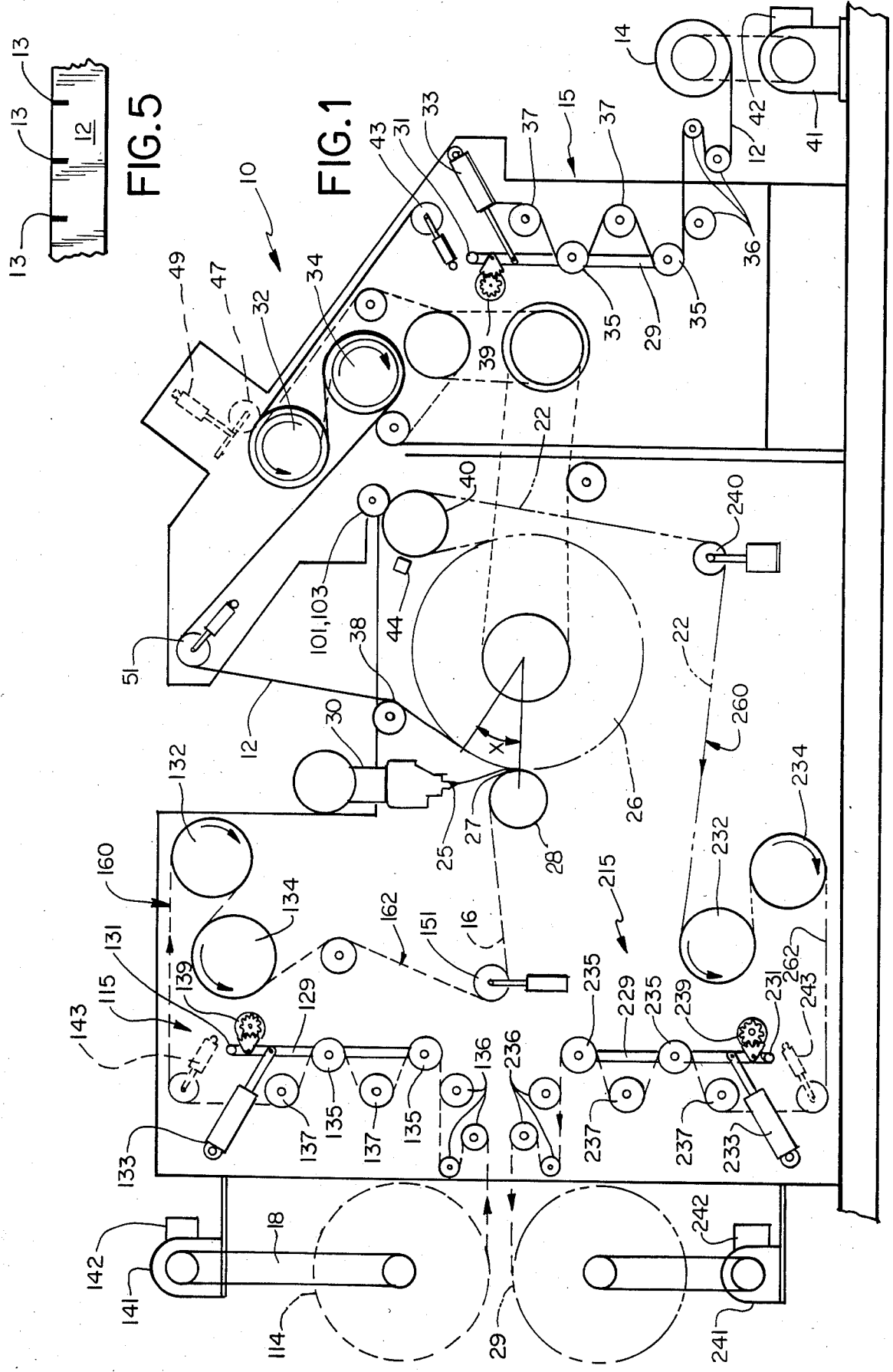
FIG. 1 is a schematic side elevation view of a laminator device of the present invention.

As illustrated schematically by FIG. 1, the laminating device 10 of the present invention may comprise a film supply means such as film spool 14 for supplying a web of extensible plastic film material 12 and a paper supply means such as paper spool 114 for supplying a web of paper material 160. A composite collection means such as a composite takeup spool 29 is provided for collecting a web of composite (laminate) material 22 formed from the paper and film web at a laminating nip 27. Control systems are provided for controlling the distortion of the film web and for controlling the tension in the paper web, FIG. 3, and the tension in the composite web, FIG. 4.

The Film Web

The film, upon leaving the film spool 14, may pass through a film unwind dancer assembly 15 which may comprise a dancer arm 29 pivotally mounted at 31 to the machine frame. The dancer arm 29 is also pivotally attached to a pneumatic cylinder unit 33 having a preset internal pressure which is adjustable to accommodate different film web tensions which may be encountered in the use of different types of films or films of different thickness or width. A pair of longitudinally spaced apart dancer idler rolls 35 are mounted on dancer arm 29 and a second pair of idler rolls are mounted at the machine frame in a longitudinally and transversely spaced apart relationship with the dancer rolls 35. The film web 12 is wrapped back and forth between two pairs of rolls 35, 37 as shown in FIG. 1. Changes in the film web tension, as a result of film speed fluctuation produced either upstream or downstream of the dancer are rapidly dampened out by pivotal movement of the dancer arm 29 in response to the film speed differential. The constant pressure pneumatic cylinder coacts with the dancer arm to maintain the film web at a preset tension associated with the pneumatic cylinder pressure. A potentiometer unit 39 is actuated by pivotal movement of the dancer arm 29 and generates a control signal which is used to control a film spool motor 41 having a tachometer generator 42 to either increase or decrease the rate at which film web 12 is unwound from the spool. The film web is drawn from the spool 14 by draw rolls 32, 34 as discussed in further detail below. Thus the dancer assembly provides a means for maintaining the tension of the film web at a relatively constant tension value in a first film web tension zone between the film spool 14 and the draw rolls 32, 34.

A film web tension monitor such as an idler roll and load cell transducer assembly 43 monitors the tension in the film web 12 in the first tension zone and generates a tension monitoring control signal in response thereto which is input to a computer means 100 for control purposes as explained in further detail hereinafter. The film 12 may pass over a number of cylindrical idler rolls 36 which may be used to straighten and flatten the film 12 as it leaves the spool 14 and which also function to properly align the film material 12 with a first motive means such as S-wrap rolls 32, 34. The first motive means provides the motive force for drawing the film 12 from the film supply means and also cooperates with a second motive means in controlling the stretch in the film material, as described in further detail below. The first motive means may comprise various draw roll configurations such as pinch rolls, also referred to as nip rolls, and other types of draw rolls. In the embodiment illustrated in FIG. 1, the first motive means comprise S-wrap rolls 32, 34. (In an alternate embodiment, an idler pinch roll 47 having roll contacting force applied thereto by a pneumatic cylinder unit 49 may be used to augment the drawing action of rolls 32, 34 or in another embodiment may be substituted for roll 34.) The two equal radius cylindrical rolls 32, 34 are positioned in parallel axial alignment and rotate in opposite directions at the same speed. The surface of the rolls 32, 34 must be sufficiently smooth to avoid damaging the plastic film web 12 and yet must provide sufficient frictional contact with the film web 12 to prevent slipping between the film and roll surfaces. Thus the roll surface may be rubber or any number of other surfaces. The film web is wrapped in an S-shaped configuration over and around the upstream roll 32, then over and around the downstream roll 34, as illustrated in FIG. 1. This so called "S-wrap" configuration enhances the frictional contact between the film web 12 and rolls 32, 34 providing a nonslipping "nip effect" relationship wherein the rate of film advance upon leaving the rolls 32, 34 is equal to the tangential speed component at the surface of the rolls 32, 34. After leaving the first motive means, the film web 12 passes over a second tension monitoring means into a second motive means which in the preferred embodiment, also functions as a laminating means. The second motive means may comprise a laminating nip 27 such as formed by laminating rolls 26, 28. The film web positioned between the first film motive means 32, 34 and the second film motive means 26, 27 defines a second film tension zone.

In the preferred embodiment, one or more idler rolls 38 may be used to position the film web 12 at a proper entry angle into the laminating nip 27. The film web 12 and paper web 16 are treated with an adhesive material such as, for example, a melted polymer plastic 25 (such as low density polyethylene having a melt index of approximately 8 and supplied at a temperature above 615 degrees F. and preferably 620 degrees F. to 630 degrees F.) which is supplied by an adhesive supply source 30 which causes permanent bonding of the paper web 16 and plastic 12 as it passes through the laminating nip 27. The laminating rolls 26, 28 may comprise a main roll 26 which may have a diameter of 24 inches and which may contain cooling (or heating) elements to aid in the production of the adhesive bond between the paper and film. The main roll 26 is driven by a main drive means such as main drive motor 50 illustrated in FIG. 2 and discussed in further detail below. Compression roll 28 may also be driven by the same drive motor 50 or by a conventional "tendency" drive unit (not shown) which overcomes any frictional resistance between the webs and rolls to prevent composite distortion, or may alternatively be driven solely by rolling contact with the main roll 26. Compression roll 28, in one embodiment, is also a chill roll and has a rubber outer surface to prevent web slippage which is cooled by radially inwardly positioned roll cooling structure of a type well known in the art.

The laminating nip 27 formed by laminating rolls 26, 28 draws the film web 12 and paper web 16 therethrough and simultaneously compresses it to form laminated composite 22. As with the S-wrap rolls 32, 34, the surfaces of the compression roll 28 and main roll 26 must be sufficiently smooth to avoid damaging the film web 12 and paper web 16 and may comprise polished steel in the case of roll 26 and smooth rubber in the case of roll 28.

Nonslipping frictional contact between the main roll 26 and film ensures that the rate of film advance through the laminating nip will be equal to the tangential velocity component of the surface of the main roll 26. Thus, the rate of film advance at the point the film leaves the S-wrap rolls 32, 34 and the rate of film advance at the laminating nip 27 is directly proportional to the rotational velocity of the S-wrap rolls 32, 34 and the rotational velocity of the main roll 26, respectively. By changing the rotational velocity of the S-wrap rolls 32, 34 with respect to the rotational velocity of the main roll 26, a speed differential is created in the film web between the point where the film leaves the S-wrap rolls 32, 34 and the point that it enters the laminating nip 27, i.e., in the second film tension zone. By increasing the rotational speed of the S-wrap rolls 32, 34 with respect to the main roll 26 so that the tangential velocity component at the surface of the S-wrap rolls 32, 34 exceeds the tangential velocity component at the surface of the main roll 26, the running film web therebetween is caused to relax. By decreasing the relative speed of the S-wrap rolls 32, 34 with respect to the main roll 26, the film is caused to stretch. The amount of stretch or relaxation in the film is dependent on the amount of difference between the surface speeds of the S-wrap rolls 32, 34 and main roll 26.

Film Length Monitoring and Control

The relative stretch in selected portions of the film web 12 subsequent to its lamination with the paper web 16 is measured by a film length monitoring means. In the preferred embodiment as shown in FIG. 5, the film web 12 is provided with photoelectricity readable preprinted marks 13 positioned at longitudinally equally spaced locations which may be near one edge of the film 12. The distance between these marks 13 will be referred to hereinafter as the "repeat length". As previously mentioned, the laminating device is designed to stretch or relax the film 12 in order to laminate a predetermined portion of the film 12 to the paper backing material 16. The distance between the marks in this ideal or design condition will be referred to as the "design repeat length". However, during operation of the laminating device 10, the film web 12 will stretch and relax and thus the distance between marks may deviate from the "design repeat length" until the system corrects itself, as discussed hereinafter. The actual distance measured between marks by the monitoring means, described hereinafter, will be referred to as the "actual repeat length".

The film length monitoring means provides data to a data processing means 100 from which the amount of stretch or relaxation in the film may be computed. The data processing means provides a control signal to an S-wrap roll speed control means responsive to the monitoring means data to selectively vary the speed of the S-wrap rolls 32, 34 with respect to the laminating rolls for imparting a predetermined amount of stretch or relaxation to the film as it passes between the S-wrap rolls and laminating rolls.

In the illustrative embodiments, the film length monitoring means comprise photoelectric sensing means, such as photoelectric unit 44, positioned at some point near the path of the composite web 22 downstream from laminating nip 27 for detecting the preprinted spaced apart marks on the film 12 edge. The specific manner in which the data processing means 100, photoelectric sensing unit 44 and other system components coact to provide film web monitoring and length control is described in previously mentioned U.S. patent application Ser. No. 624,480, filed June 22, 1984, by James Wendell Jensen and Joseph Robert Haake.

The Paper Web

As illustrated schematically by FIG. 1, the paper web 16 may pass through a dancer assembly 115 and a pair of S-wrap rolls in a configuration similar or identical to that of the film web 12 as described above. The paper web 16 may pass over a number of cylindrical idler rolls 136 which may be used to straighten, flatten, and align the paper as it leaves the spool 114.

The paper web 16 upon leaving rolls 136 may pass through a paper unwind dancer assembly 115 which may comprise a dancer arm 129 pivotally mounted at 131 to the machine frame. The dancer arm 129 is also pivotally attached to a pneumatic cylinder unit 133 having a preset internal pressure which is adjustable to accommodate different paper web tensions which may be desired in the use of different types of paperboard or paperboards of different thickness or widths. A pair of longitudinally spaced apart dancer idler rolls 135 are mounted on dancer arm 129 and a second pair of idler rolls are mounted at the machine frame in a longitudinally and transversely spaced apart relationship with the dancer rolls 135. The paper web 16 is wrapped back and forth between the two pairs of rolls 135, 137, as shown in FIG. 1. Changes in the paper web tension, as a result of paper web speed fluctuation produced either upstream or downstream of the dancer, are rapidly dampened out by pivotal movement of the dancer arm 129 in response to the paper speed differential. The constant pressure pneumatic cylinder coacts with the dancer arm to maintain the paper web at a preset tension associated with the pneumatic cylinder pressure. A potentiometer unit 139 is actuated by pivotal movement of the dancer arm and generates a control signal which is used to control a paper spool motor 141 with a tachometer generator 142 to either increase or decrease the rate at which paper web 16 is unwound from the spool thereby maintaining the pivotal movement of the dancer within predetermined limits. In another embodiment of the invention (not shown), the speed of the paper spool is controlled by a clutch brake assembly actuated in response to the dancer control signal. The paper web is drawn from the spool 114 as by draw rolls 132, 134, as discussed in further detail below. Thus, the dancer assembly provides a means for correcting and maintaining the tension of the paper web at a constant tension value in a first paper web tension zone 160 extending between the paper spool 114 and the draw rolls 132, 134.

In an alternate embodiment, a paper web tension monitor such as an idler roll and load cell transducer assembly 143 is substituted for dancer assembly 115 and monitors the tension in the film web 12 in the first tension zone and generates a tension monitoring control signal in response thereto which is input to a computer means 100 for controlling the speed of unwind roll 114 to maintain constant tension in the first tension zone of the paper web.

The paper web is divided into two isolated tension zones by paper web nip forming means such as S-wrap rolls 132, 134 or other nip forming rolls. In the preferred embodiment shown in FIG. 1, the two equal radius, cylindrical S-wrap rolls 132, 134 are positioned in spaced apart, parallel, axial alignment and rotate in opposite directions at the same speed. The surface of the rolls 132, 134 must be sufficiently smooth to avoid damaging the paper web 16 and yet must provide sufficient frictional contact with the paper web 16 to prevent slipping between the paper and roll surfaces. Thus, the roll surface may be rubber or any number of other surfaces. The paper web is wrapped in an S-shaped configuration over and around the upstream roll 132, then over and around the downstream roll 134, as illustrated in FIG. 1. This so called "S-wrap" configuration enhances the frictional contact between the paper web 16 and rolls 132, 134 providing a nonslipping "nip effect" relationship wherein the rate of paper web advance upon leaving the rolls 132, 134 is equal to the tangential speed component at the surface of the rolls 132, 134. The "nip" formed by rolls 132, 134 thus divides the paper web into a first tension zone 160 upstream of the rolls 132, 134 and a second tension zone 162 downstream of the rolls. After leaving the S-wrap rolls 132, 134, the web 16 passes over a second tension zone monitoring means, such as idler roll and tension transducer assembly 151, into a second nip which in the preferred embodiment comprises laminating nip 27 formed by laminating rolls 26, 28. The paper web portion positioned between the S-wrap rolls 132, 134 and the laminating nip 27 defines the second paper web tension zone 162. The tension in the second tension zone is controlled by adjusting the speed of the S-wrap rolls 132, 134 relative the laminating rolls 26, 28.

Paper Tension Monitoring and Control

Figure 3:
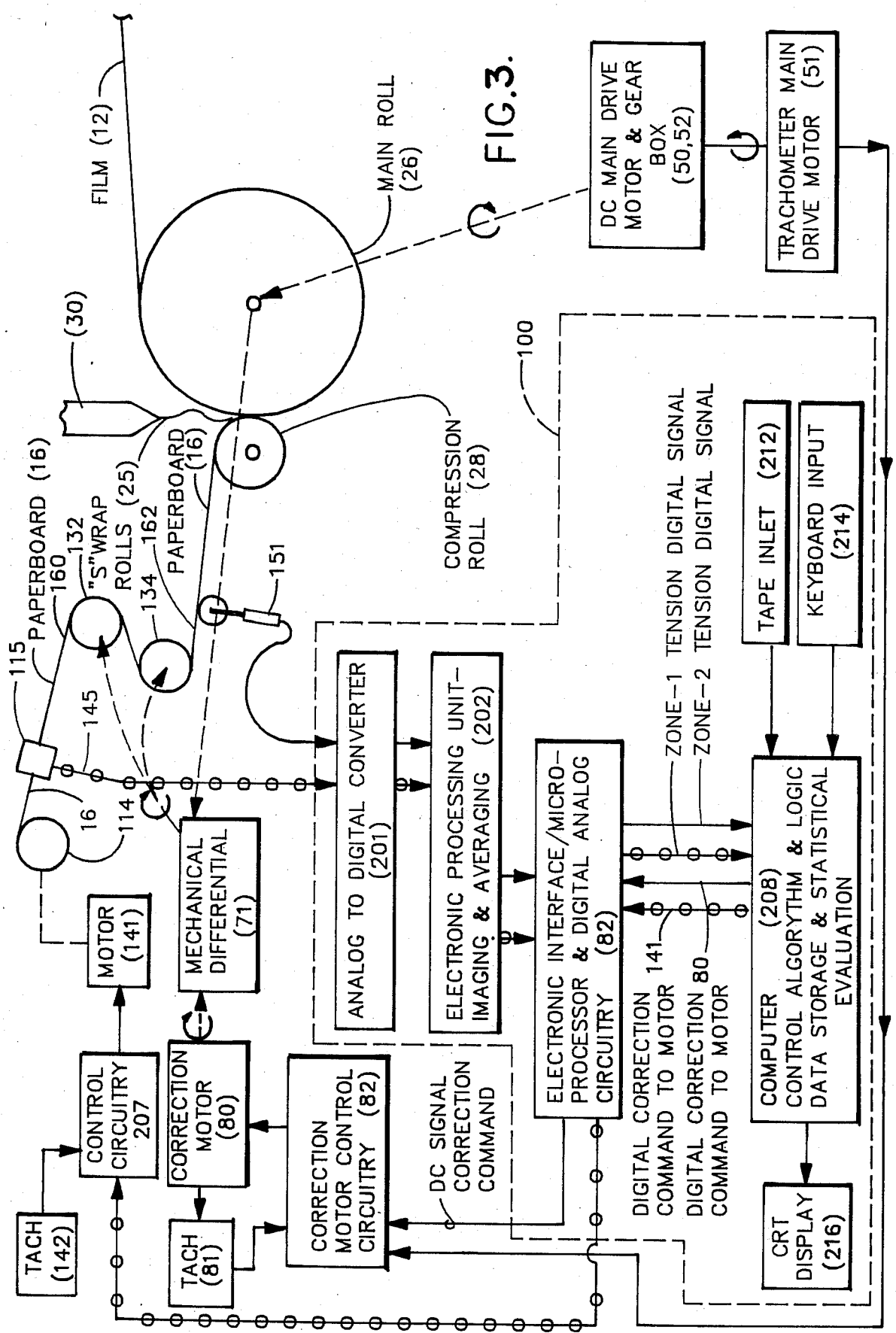
FIG. 3 is a control diagram with a partial schematic view of certain mechanical components of the laminator device of FIG. 1, illustrating the various control functions performed for controlling tension in a paper web.

The basic paper web control system components of one preferred embodiment of the invention is illustrated in FIG. 3.

In general, the paper web control system processes the signal from the dancer assembly potentiometer unit 139 to control the speed of the unwind roll 114 for maintaining a relatively constant tension in the first tension zone 160 and also processes the signal from the tension transducer 151 to control the speed of the S-wrap rolls 132, 134 relative the speed of the laminating rolls 26, 28 for maintaining a relatively constant tension in the second tension zone 162.

The control of tension in the first tension zone 160 will now be described in detail with reference to FIGS. 1 and 3. Speed fluctuations in the paper web leaving the unwind spool 114 cause relative pivotal movement of dancer arm 129 which acts as a relatively constant tension accumulator maintaining the paper web in zone 160 at a relatively constant tension value determined by the pressure setting of pneumatic cylinder 133. The pivotal movement of dancer arm 129 in turn produces rotation in potentiometer unit 139. The relative rotated position of the potentiometer unit causes a corresponding fluctuation in a displacement indicating analog control signal 145 produced by the potentiometer unit. For example, an increase in signal strength may indicate displacement of the dancer in one direction associated with an increase in the paper unwind speed, with a decrease in signal strength indicating dancer movement in the opposite direction associated with a decrease in paper unwind speed. The analog signal 145 from potentiometer unit 139 may be converted to a digital signal by a conventional analog to digital converter 201, FIG. 3. The signal may thereafter be processed by an electric processing unit 202 to average the digital signals received from the A to D converter 201. Thereafter, the averaged signal from unit 202 may be provided to a microprocessor and digital to analog circuitry 206 which transmits the averaged digital signal to a microcomputer 208. Microcomputer 208 contains the control algorithm and logic for the various control functions and may receive input and display information with a conventional input device such as tape unit 212, keyboard unit 214, and display screen 216. The computer 208 processes the digital signal comparing it to a preselected tension value and outputs a digital correction command to the interface circuitry 206 which converts the digital command to an analog voltage command which is provided to unwind roll correction motor control circuitry 207. The control circuitry 207 upon receiving the analog control command varies the current to unwind roll motor 141 to adjust the speed thereof to return the dancer 115 to a vertically centered, neutral position. A feedback control signal is provided to control circuitry 207 by the unwind roll motor tachometer unit 142. The same control function might also be performed entirely through dedicated electronic control circuitry (not shown). The dancer assembly 115 thus acts as an accumulator which quickly dampens out high frequency speed fluctuations which might be caused, for example, by eccentricity in the unwind roll. The dancer assembly also coacts with the potentiometer unit 139 to provide a signal which is processed to control the speed of rotation of the unwind roll to provide speed adjustment for lower frequency speed variation such as caused by the changing web diameter as the spool unwinds. This speed adjustment enables the dancer assembly to remain within it's operating limits.

The control of tension in the second paper web tension zone 162 through speed variation of rolls 132, 134 will now be described.

Figure 2:
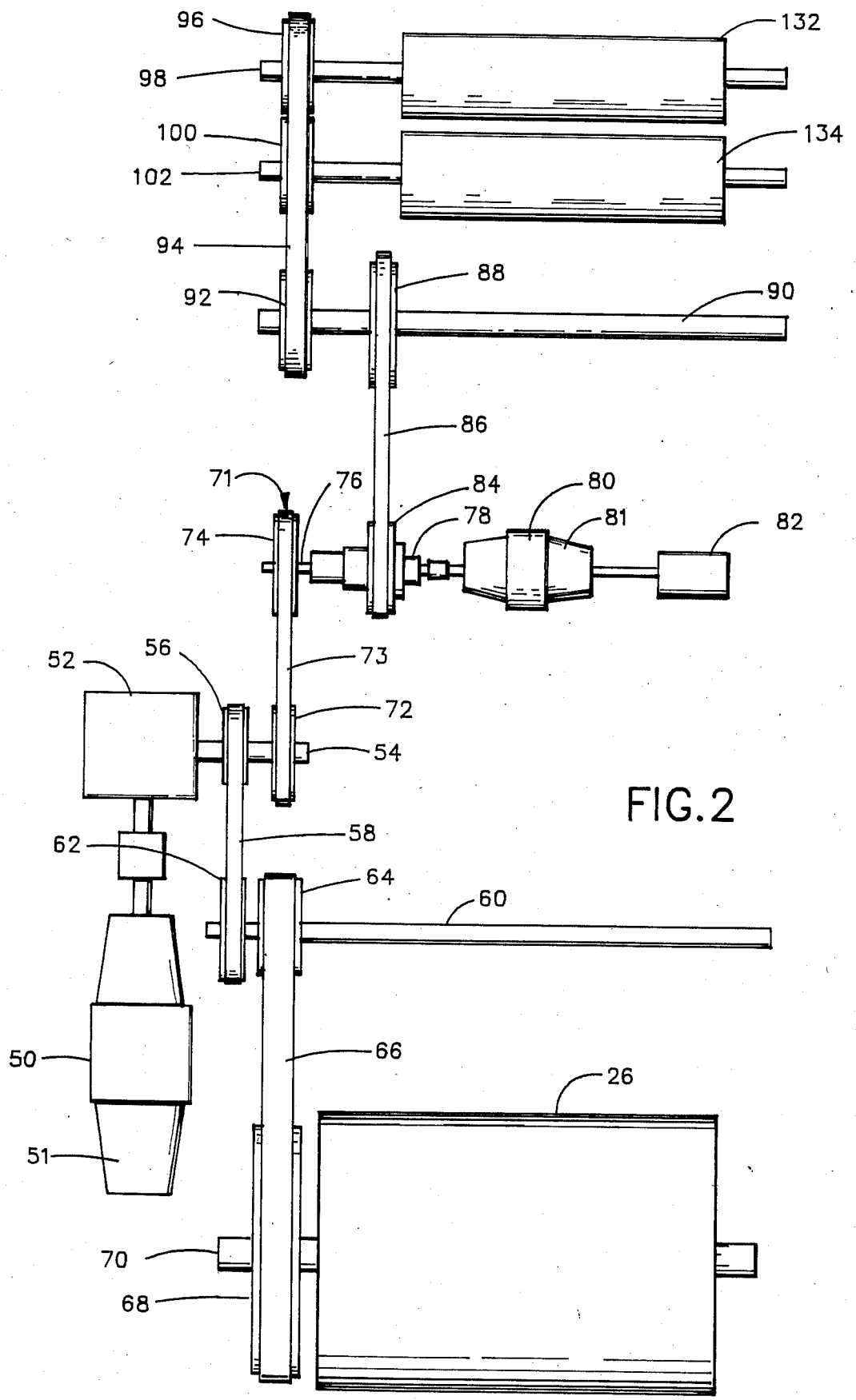
FIG. 2 is a schematic plan view of a mechanical linkage system for the laminator device of FIG. 1.

The mechanical linkage for controlling the speed of S-wrap rolls 132, 134 is shown in FIG. 2. A main drive means such as main drive motor 50 with tachometer generator unit 51, is operably connected to a main gear box 52 which in turn drives main drive shaft 54. Main drive shaft pulley 56 mounted on shaft 54 is connected by means of drive belt 58 to a secondary drive shaft pulley 62 coaxially mounted on secondary drive shaft 60 with pulley 64. Pulley 64 is operably connected to main roll pulley 68 by another belt 66 whereby the main roll 26 is rotated about main roll drive shaft 70. S-wrap rolls 132, 134 are mechanically linked to phase drive unit 71 and main drive motor 50 as by main drive shaft parasite pulley 72 operably connected by belt 73 to phase drive pulley 74, in turn mounted on phase drive shaft 76. Phase drive shaft 76 is operably connected by conventional means well known in the art to a differential unit 78, such as, for example, a Conao 25 Differential Unit, having a phase drive correction pulley 84. Phase drive correction pulley 84 is operably connected by means of a drive belt 86 to conversion pulley 88 mounted on conversion drive shaft 90 upon which S-wrap connector pulley 92 is coaxially mounted. S-wrap roll belt 94 is operably connected to upper S-wrap roll pulley 96 and lower S-wrap pulley 100 in an S-wrap configuration whereby first and second S-wrap shafts 98, 102 and consequently S-wrap rolls 132, 134 are rotated in opposite directions at the same speed.

Mechanical input to differential unit 78 is provided by correction motor 80 for the purpose of increasing or decreasing the rotation speed of phase drive correction pulley 84. The correction motor rotational input is added or subtracted from the speed of shaft 76 by an internal differential gearing mechanism (not shown) of a type well known in the mechanical arts. Correction motor 80 is actuated and controlled by correction motor control circuitry unit 82 which, in turn, receives commands from processing unit 100 as discussed in further detail herein. (The S-wrap rolls 32, 34 for film web 12 may be mechanically linked to shaft 60 in the same manner as described above for rolls 132, 134.)

A tension indicating analog signal from transducer unit 151, FIG. 3, is converted to a digital signal by A to D converter 201 and then is supplied to electronic processing unit 202 which averages the digital signal. The tension value may be displayed on a conventional CRT unit or LED digital display at 204. The averaged tension values from unit 202 are also provided to electronic microprocessor and digital to analog circuitry 206 which transmits digital data corresponding to the measured tension to a microcomputer 208. The microcomputer 208 contains the control algorithm and logic for tension control in the second zone as well as the first zone. The computer 208 processes the digital second tension zone signal from interface microprocessor and circuitry 206 and comparing it to a preselected tension value outputs a digital correction command to the interface circuitry which converts the digital command to an analog voltage command. The analog voltage command is provided to the correction motor control circuitry 82. A main drive reference speed signal is provided from the main drive motor tachometer unit 51 to the correction motor control circuitry 82, and a feedback reference speed signal from the correction motor 80 is also provided to the correction motor control circuitry. The correction motor control circuitry processes these reference signals and correction signal and provides a proper signal to the correction motor to increase, decrease or maintain the present speed of the correction motor as may be required. The correction motor mechanical output to mechanical differential unit 71 influences the speed of the S-wrap rolls 132, 134 to increase or decrease the speed of the paper web 16 with respect to the speed of the laminating nip and thus increases or decreases the tension of the web in the second tension zone 162. An increase in the speed of the S-wrap rolls 132, 134 relative to the speed of the laminating rolls 26, 28 causes a corresponding decrease in tension. A decrease in the speed of rolls 132, 134 relative rolls 26, 28 causes a corresponding increase in tension. Thus, the tension in the second tension zone 162 may be maintained at a constant value by proper adjustment of the speed of the S-wrap rolls 132, 134 relative the laminating rolls 26, 28 in the manner described above.

It will be appreciated from the above described control arrangement that the tension in the first tension zone 160 remains relatively independent of the speed of operation of the S-wrap rolls 132, 134. For example, if the speed of rolls 132, 134 increases, the resulting deflection of dancer arm 129 to the right (as shown in FIG. 1) causes a corresponding control signal to be sent to the unwind spool motor 141 to increase the speed of the spool 114 to maintain the preset tension in the first zone 160 at a constant value.

It will also be appreciated that the tension in the second zone 162 may be controlled independently of the tension in the first zone 160. Thus, by changing the speed of S-wrap rolls 132, 134 relative rolls 26, 28, the tension in the second tension zone may be varied while the tension in the first tension zone remains at the preset tension of the dancer assembly. It is among the discoveries of the present invention that a surprisingly improved result in the quality of the laminate 22 formed from the paper web 16 and film web 12 is achieved by maintaining the tension in the second tension zone 162 at a reduced value relative to the tension in the first tension zone 160. Preferably the reduction in tension in the second zone is between 0% and 30% and most preferably between 5% and 20%.

The Composite Web

As illustrated schematically by FIG. 1, the composite web 22 upon leaving laminating nip 27, may pass over one or more idler rolls 40 and thereafter passes through a pair of nip forming rolls 232, 234 which divide the composite web into a first, upstream tension zone 260 and a second, downstream tension zone 262.

The composite web nip forming means may be S-wrap rolls 232, 234 which may be identical in construction to rolls 132, 134 discussed above or other nip forming rolls. The "nip" formed by rolls 232, 234 thus divides the composite web into a first tension zone 260 upstream of the rolls 232, 234 and a second tension zone 262 downstream of the rolls. Before entering the S-wrap rolls 232, 234, the web 22 passes over a first tension zone monitoring means, such as idler roll and tension transducer assembly 240. The composite web portion positioned between the S-wrap rolls 232, 234 and the laminating nip 27 defines the first composite tension zone 260. The tension in the first tension zone is controlled by adjusting the speed of the S-wrap rolls 232, 234 relative the laminating rolls 26, 28.

The composite web 22 upon leaving rolls 232, 234 may pass through composite takeup dancer assembly 215 which may comprise a dancer arm 229 pivotally mounted at 231 to the machine frame. The dancer arm 229 is also pivotally attached to a pneumatic cylinder unit 233 having a preset internal pressure which is adjustable to accommodate different paper web tensions which may be desired in the use of different types of composite or composite of different thickness or widths. A pair of longitudinally spaced apart dancer idler rolls 235 are mounted on dancer arm 229 and a second pair of idler rolls are mounted at the machine frame in a longitudinally and transversely spaced apart relationship with the dancer rolls 235. The composite web 22 is wrapped back and forth between the two pairs of rolls 235, 237, as shown in FIG. 1. Changes in the web tension, as a result of composite web speed fluctuation produced either upstream or downstream of the dancer, are rapidly dampened out by pivotal movement of the dancer arm 229 in response to the composite speed differential. The constant pressure pneumatic cylinder 233 coacts with the dancer arm to maintain the composite web at a preset tension associated with the pneumatic cylinder pressure. A potentiometer unit 239 is actuated by pivotal movement of the dancer arm and generates a control signal which is used to control a composite takeup spool motor 241 with a tachometer generator 242 to either increase or decrease the rate at which composite web 22 is wound onto the spool thereby maintaining the pivotal movement of the dancer within predetermined limits. In another embodiment of the invention (not shown), the speed of the spool 29 is controlled by a clutch brake assembly actuated in response to the dancer control signal. Thus, the dancer assembly 215 provides a means for adjustably maintaining the tension of the composite web at a constant tension value in a second composite web tension zone 262 extending between the composite spool 29 and the draw rolls 232, 234.

In an alternate embodiment, a composite web tension monitor such as an idler roll and load cell transducer assembly 243 is substituted for dancer assembly 215 and monitors the tension in the film web 12 in the second tension zone and generates a tension monitoring control signal in response thereto which is input to a computer means 100 for controlling the speed of windup spool 29 to maintain constant tension in the composite web.

Composite Web Tension Monitoring and Control

Figure 4:
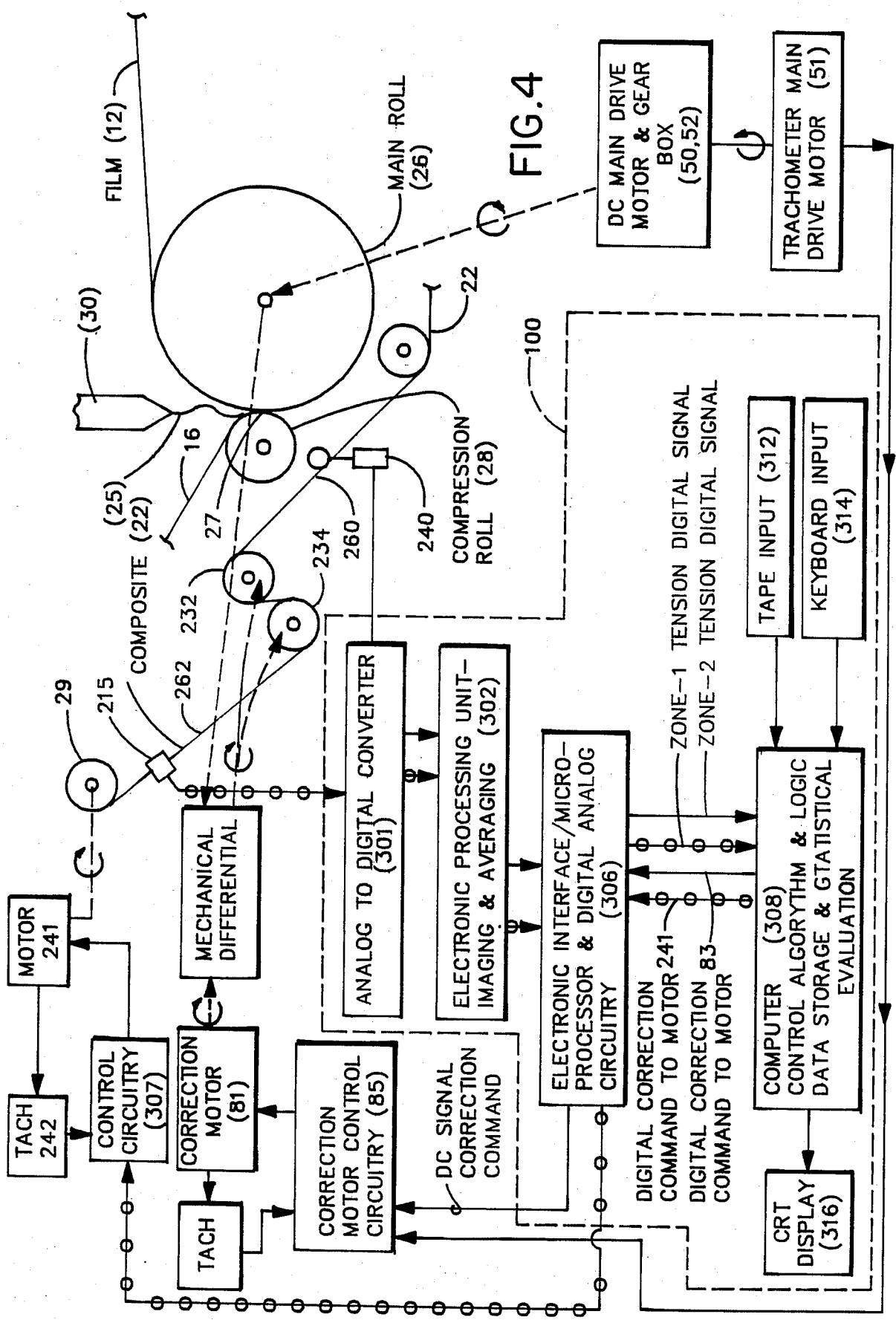
FIG. 4 is a control diagram with a partial schematic view of certain mechanical components of the laminator device of FIG. 1, illustrating the various control functions performed for controlling tension in a composite web.

The basic composite web control system components of one preferred embodiment of the invention are illustrated in FIG. 4.

In general, the composite web control system processes the signal from the tension transducer 240 to control the speed of the S-wrap rolls 232, 234 relative the speed of the laminating rolls 26, 28 for maintaining a relatively constant tension in the first tension zone 260 and also processes the signal from the dancer assembly potentiometer unit 239 to control the speed of the takeup roll 29 for maintaining a relatively constant tension in the second composite tension zone 262.

The control of tension in the first composite web tension zone through speed variation of rolls 232, 234 will now be described.

The mechanical linkage for controlling the speed of S-wrap rolls 232, 234 may be identical to that shown in FIG. 2 for rolls 132, 134.

A tension indicating analog signal from transducer unit 251 is converted to a digital signal by A to D converter 301 and then is supplied to electronic processing unit 302 which averages the tension in the first composite tension zone from the digital signal. The averaged tension values from unit 302 are also provided to electronic microprocessor and digital to analog circuitry which transmits digital data corresponding to the measured tension to a microcomputer 308. The microcomputer 308 contains the control algorithm and logic for tension control in the first zone as well as the second zone. The computer 308 processes the digital first tension zone signal from interface microprocessor and circuitry 306, comparing it to a preselected tension value, and outputs a digital correction command to the interface circuitry which converts the digital command to an analog voltage command. The analog voltage command is provided to the correction motor control circuitry 85. A main drive reference speed signal is provided from the main drive motor tachometer unit to the correction motor control circuitry 85 and a feedback reference speed signal from the correction motor is also provided to the correction motor control circuitry 85. The correction motor control circuitry processes these reference signals and correction signal and provides a proper signal to the correction motor 83 to increase, decrease or maintain the present speed of the correction motor as may be required. The correction motor mechanical output to mechanical differential unit influences the speed of the S-wrap rolls 232, 234 to increase or decrease the speed of the composite web 22 with respect to the speed of the laminating nip and thus increases or decreases the tension of the web in the first tension zone 260. An increase in the speed of the S-wrap rolls 232, 234 relative to the speed of the laminating rolls 26, 28 causes a corresponding increase in tension. A decrease in the speed of rolls 232, 234 relative rolls 26, 28 causes a corresponding decrease in tension. Thus, the tension in the first composite tension zone 260 may be maintained at a constant value by proper adjustment of the speed of the S-wrap rolls 232, 234 relative the laminating rolls 26, 28 in the manner described above.

The control of tension in the second composite tension zone 262 will now be described in detail with reference to FIGS. 1 and 4. Speed fluctuations in the composite web produced by the takeup spool 29 cause relative pivotal movement of dancer arm 229 which acts as a constant tension accumulator maintaining the web in zone 262 at a constant tension value determined by the pressure setting of pneumatic cylinder 233. The pivotal movement of dancer arm 229 in turn produces rotation in potentiometer unit 239. The relative rotated position of the potentiometer unit causes a corresponding fluctuation in a displacement indicating analog control signal produced by the potentiometer unit. For example, an increase in signal strength may indicate displacement of the dancer in one direction associated with an increase in the composite takeup speed, with a decrease in signal strength indicating dancer movement in the opposite direction associated with a decrease in takeup speed. The analog signal from potentiometer unit 239 may be converted to a digital signal by a conventional analog to digital converter 301, FIG. 4. The signal may be thereafter be processed by an electric processing unit 302 to average the digital signals received from the A to D converter 301. Thereafter, the averaged signal from unit 302 may be provided to an electric interface microprocessor and digital to analog circuitry 306 which transmits the averaged digital signal to a microcomputer 308. The computer 308 processes the digital signal comparing it to a preselected tension value and outputs a digital correction command to the interface circuitry 306 which converts the digital command to an analog voltage command which is provided to takeup spool correction motor control circuitry 307. The control circuitry 307 upon receiving the analog control command varies the current to takeup spool motor 241 to adjust the speed thereof to return the dancer to a vertically centered, neutral position. A feedback control signal is provided to control circuitry 307 by the takeup spool motor tachometer unit 242. The same control function might also be performed entirely through dedicated electronic control circuitry (not shown). The dancer assembly thus acts as an accumulator which quickly dampens out high frequency speed fluctuations which might be caused, for example, by eccentricity in the takeup spool. The dancer assembly also coacts with the potentiometer unit 239 to provide a signal which is processed to control the speed of rotation of the takeup spool to provide speed adjustment for lower frequency speed variation such as caused by the changing web diameter as the spool winds up. This speed adjustment enables the dancer assembly to remain within its operating limits.

It will be appreciated from the above described control arrangement that the tension in the first tension zone 260 remains relatively independent of the speed of the speed of operation of the composite takeup spool.

It will also be appreciated that the tension in the first zone 260 may be controlled independently of the tension in the second zone 160. Thus, by changing the speed of S-wrap rolls 232, 234 relative rolls 26, 28, the tension in the first tension zone may be varied while the tension in the second tension zone remains at the preset tension of the dancer assembly 215. Thus, a laminating apparatus is provided which has relatively constant tension in both the paper web and the composite web at the laminating nip.

It is contemplated that the inventive concepts herein described may be variously otherwise embodied and it is intended that the appended claims be construed to include alternative embodiments of the invention except insofar as limited by the prior art.

What is claimed is:

1. An apparatus for laminating plastic film material to a paper material to form a laminated composite the film material and paper material each passing through the apparatus in a continuous longitudinally extending web having an upstream portion entering the apparatus and a downstream portion exiting the apparatus; the apparatus comprising:
   (a) paper supply unwind roll means for providing a continuous web of paper to be laminated;
   (b) film supply unwind roll means for providing a continuous web of film to be laminated;
   (c) paper supply speed control means for controlling the rate at which paper is supplied from said paper unwind roll means;
   (d) laminating nip means for drawingly engaging said film web and said paper web in parallel touching contact whereby each said web is moved at the same web speed, and for bondingly compressing said film web to said paper web to form a laminated composite web;
   (e) composite takeup roll means for windingly collecting said laminated composite web formed at said laminating nip means;
   (f) composite takeup roll speed control means for controlling the rate at which composite is collected by said takeup roll means;
   (g) web tension segregating means positioned along at least one of said paper web and said composite web in engaging contact with said associated web for providing a distal and a proximal tension zone in said engaged web between an associated web roll means and said laminating nip means for maintaining the tension in said proximal tension zone at a substantially constant, preselected value substantially independent of changes in the rate of operation of said associated web roll means;
   (h) said proximal tension zone being positioned adjacent said laminating nip and said distal tension zone being positioned adjacent said proximal tension zone.

2. The invention of claim 1 further comprising proximal web tension monitoring means for monitoring the tension in said proximal tension zone and for providing a proximal tension zone monitoring signal in response thereto.

3. The invention of claim 2 wherein said tension segregating means comprises at least two tension segregating rolls.

4. The invention of claim 3 further comprising segregating roll speed control means for controlling the speed of said tension segregating rolls based on said proximal tension zone monitoring signal for maintaining said preselected tension value in said proximal tension zone.

5. The invention of claim 4 wherein said tension roll speed control means comprises:
   signal processing means for comparing said proximal tension zone monitor signal to a preselected tension value and for providing speed control commands in response to said comparison; and
   tension roll motor means for driving said tension segregating rolls at an adjustable speed and for receiving said speed control commands from said signal processing means for adjusting the speed of said tension segregating rolls for maintaining said preselected tension value in said proximal tension zone.

6. The invention of claim 1 further comprising distal tension zone tension control means for maintaining the tension in said distal tension zone at a relatively constant preset value.

7. The invention of claim 6 wherein said distal tension zone tension control means comprises:
   dancer means, said dancer means being set at a preselected pressure and being pivotally deflectable for maintaining said associated web in said distal tension zone at a constant tension value associated with said preselected dancer pressure; and
   dancer displacement signal generating means for generating a distal tension zone control signal based on the relative pivotal deflection of said dancer means.

8. The invention of claim 7 further comprising signal processing means for receiving and processing said distal tension zone control signal and generating command signals in response thereto, said command signals being received by said associated web speed control means for continuously adjusting the speed of said web associated roll means for maintaining the amount of deflection of said dancer means within predetermined limits whereby the tension in said distal tension zone is maintained at said preselected value.

9. The invention of claim 1 wherein said tension segregating means comprises a pair of rolls engaging said associated web in an S-shaped configuration.

10. The invention of claim 1 wherein said tension in said distal tension zone is greater than said tension in said proximal tension zone.

11. The invention of claim 1 wherein said web tension segregating means is associated with said paper web.

12. The invention of claim 1 wherein said web tension segregating means is associated with said composite web.

13. The invention of claim 1 wherein said web tension segregating means comprises a first web tension segregating means associated with said paper web and a second web tension segregating means associated with said composite web.

14. An apparatus for laminating plastic film material to a paper material to form a laminating composite the film material and paper material each passing through the apparatus in a continuous longitudinally extending web having an upstream portion entering the apparatus and a downstream portion exiting the apparatus; the film material normally being extensibly deformable such that the longitudinal distance between any two reference points on the film web may vary during lamination; the apparatus comprising:
  (a) paper supply unwind roll means for providing a continuous web of paper to be laminated;
  (b) film supply unwind roll means for providing a continuous web of film to be laminated;
  (c) paper supply speed control means for controlling the rate at which paper is supplied from said paper unwind roll means;
  (d) film supply speed control means for controlling the rate at which film is supplied from said film unwind means;
  (e) laminating nip means for drawingly engaging said film web and said paper web in parallel touching contact whereby each said web is moved at the same web speed, and for bondingly compressing said film web to said paper web to form a laminated composite web;
  (f) film web stretch control means positioned between said laminating nip means and said film supply unwind roll means for frictionally engaging said film web and for varying the web velocity of the portion of the film web passing therethrough relative to the velocity of the laminating nip for selectively stretching or shrinking the film web portion passing between the film web stretch control means and the laminating nip during continuous movement of the film web through the laminating nip means;
  (g) paper web tension segregating means positioned between said paper supply unwind roll means and said laminating nip means in frictionally engaging contact with said paper web for providing a first paper tension zone immediately upstream therefrom and a second paper tension zone between said paper web tension segregating means and said laminating nip means for maintaining the tension in said second paper tension zone at a substantially constant, preselected value.

15. The invention of claim 14 further comprising:
composite takeup roll means for collecting said laminated composite;
composite takeup speed control means for controlling the rate at which composite is collected on said composite takeup roll means;
with said composite web for providing a first composite tension zone immediately downstream from said composite web tension segregating means and a second composite tension zone between said composite web tension segregating means and said laminating nip means for maintaining the tension in said second composite tension zone at a substantially constant, preselected value.

16. A method of laminating paper sheet material in roll form to plastic film sheet material in roll form by use of an adhesive material comprising the steps of:
mounting a roll of the paper sheet material on a first feed roll;
mounting a roll of the film sheet material on a second feed roll;
simultaneously, continuously unwinding the roll of paper sheet material and the roll of film sheet material to provide a length of paper sheet material and a length of film sheet material;
simultaneously continuously advancing the length of paper sheet material and the length of film sheet material to a laminating station comprising a main roll and a compression roll defining a nip area therebetween and an adhesive applying apparatus located adjacent the nip area for laminating the film sheet material to the paper sheet material;
continuously applying adhesive material between the paper sheet material and the film material in the nip area;
applying pressure to the paper sheet material and the film sheet material and the adhesive material during passage through the nip area to form a fixed lamination;
passing the length of paper sheet material through adjustable speed, tension segregating rolls located between the lamination station and the first feed roll and variably adjusting the speed of the tension segregating rolls to maintain the tension in the length of paper between the tension segregating rolls and the laminating station at a predetermined value;
monitoring the tension in the length of paper between the tension segregating rolls and the laminating station and generating a first control signal representative of that tension; and
adjusting the speed of the tension segregating rolls in accordance with the first control signal, so as to maintain the tension in the length of paper between the tension segregating rolls and the laminating station within a predetermined tolerance.

17. The method of claim 16 comprising the further steps of:
passing the length of paper sheet material through a dancer assembly having a preset pressure and positioned between the first feed roll and the tension segregating rolls;
generating a second control signal based upon the pivotal deflection of the dancer assembly; and
adjusting the speed of the first feed roll in accordance with the second control signal, so as to maintain the pivotal deflection of the dancer assembly within predetermined limits so as to maintain the tension in the length of paper material passing through the dancer assembly within a predetermined tolerance.

18. The invention of claim 17 comprising the further step of maintaining the tension in the length of paper material between the tension segregating rolls and the laminating station below the tension in the length of paper between the first feed roll and the tension segregating rolls.

19. A method of reducing speed fluctuations in the laminating rolls of a laminating device of the type having a laminating nip defined by a pair of laminating rolls which simultaneously draws and compresses together a first and second component web to form a laminated third composite web wherein the speed of the laminating rolls is subject to fluctuation from tension fluctuations in the webs, comprising the steps of:
(a) passing at least one of the three webs through tension segregating rolls;
(b) variably adjusting the speed of the tension segregating rolls with respect to the laminating rolls to maintain the tension in the length of the web positioned between the tension segregating rolls and the laminating nip at a constant value.

* * * * *